United States Patent [19]

Budd et al.

[11] Patent Number: 4,680,191

[45] Date of Patent: Jul. 14, 1987

[54] CROSS-CUT EXTRUSION METHOD

[75] Inventors: David L. Budd, Plano; David P. Fowler, Irving, both of Tex.

[73] Assignee: Frito-Lay, Inc., Dallas, Tex.

[21] Appl. No.: 698,250

[22] Filed: Feb. 5, 1985

[51] Int. Cl.$^4$ ............................. A21D 8/00; A23P 1/12
[52] U.S. Cl. ..................................... 426/439; 426/144; 426/560; 426/549; 426/516; 426/517; 425/461
[58] Field of Search ............... 426/461, 549, 637, 144, 426/560, 439, 516, 517; 425/133.1, 396, 378 R; 72/102–107, 176; 264/280–286

[56] References Cited

U.S. PATENT DOCUMENTS

| | | | |
|---|---|---|---|
| 2,769,715 | 11/1956 | Stahmer | 426/144 |
| 3,270,370 | 9/1966 | Mercer | 18/12 |
| 3,279,501 | 10/1966 | Donald | 138/118 |
| 3,281,897 | 2/1964 | Mercer | 18/14 |
| 3,286,305 | 11/1966 | Seckel | 425/378 R |
| 3,331,725 | 7/1967 | Mercer | 156/500 |
| 3,496,605 | 2/1970 | Onaka | 18/14 |
| 3,540,078 | 11/1970 | Schultz | 18/12 |
| 3,560,306 | 2/1971 | Nalle, Jr. | 156/500 |
| 3,604,055 | 9/1971 | McHardy | 18/12 N |
| 3,616,080 | 10/1971 | Nalle, Jr. | 156/500 |
| 3,674,898 | 7/1972 | Larsen | 264/146 |
| 3,957,565 | 5/1976 | Livingston et al. | 156/500 |
| 4,413,973 | 11/1983 | Peters | 425/461 |
| 4,508,739 | 2/1985 | Ryan | 426/144 |

FOREIGN PATENT DOCUMENTS

| | | |
|---|---|---|
| 836555 | 6/1960 | United Kingdom . |
| 1604585 | 12/1981 | United Kingdom . |
| 1604586 | 12/1981 | United Kingdom . |

Primary Examiner—Joseph Golian
Assistant Examiner—Marianne M. Cintins
Attorney, Agent, or Firm—Bernard, Rothwell and Brown

[57] ABSTRACT

An extruded, cross-cut snack food product and a method and apparatus for producing extruded, generally planar food products having ridges and valleys formed on opposite sides thereof, wherein the ridges and valleys on each side are parallel to each other, but are at an angle relative to the ridges and valleys on the opposite side. As a result, an extruded food product piece with unique texture, flavor and appearance is produced having substantial strength.

20 Claims, 5 Drawing Figures

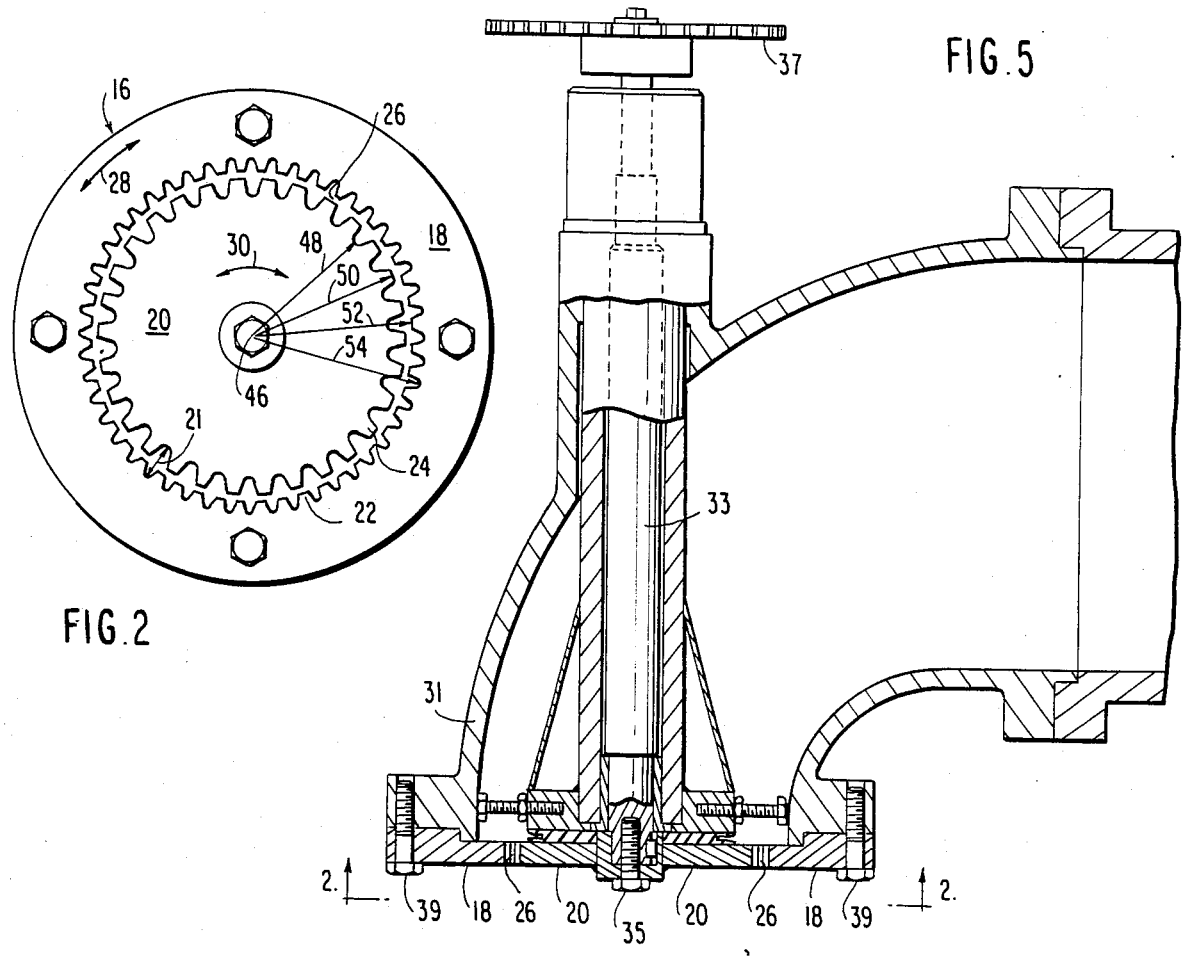
FIG. 2
FIG. 5
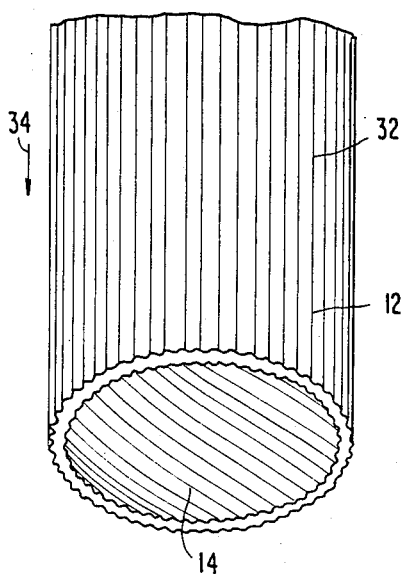
FIG. 3
FIG. 4
FIG. 1

CROSS-CUT EXTRUSION METHOD

BACKGROUND OF THE INVENTION

1. Field of the Invention

This invention relates to a cross-cut corrugated food product and to a method and apparatus for forming a cross-cut corrugated food product.

2. Description of the Background Art

Snack food products having a wavy or corrugated configuration have been commercially manufactured and sold. One such product, which has met with some commercial success, is the corrugated potato chip, in which corrugations on each side of the chip are "in-phase", i.e., the ridges on one side of the chip directly overlie valleys on the opposite side, so that the thickness of the chip is substantially uniform throughout.

Snack foods having corrugations which are "out-of-phase" have also been known. These products have corrugations wherein the ridges on one side overlie ridges on the other side which results in a periodic variation in thickness, but the frequency of the occurrences of the different thicknesses remains substantially uniform. Such out-of-phase corrugated snack foods, when subjected to the cooking or frying process, have a variety of texture and flavor characteristics due to the different cooking rates of the various thicknesses. However, there is no variation in the percentages of occurrences of the different thicknesses. Furthermore, such "out-of-phase" products have a tendency to break at their weakest locations, namely, the areas of the oppositing valleys in the corrugations.

Criss-cross or cross-cut snack foods are also known in the art. Such products have parallel corrugations on each surface, but the corrugations on one surface are at an angle relative to those on the other surface. Such "cross-cut" products not only have a variation in thicknesses, but unlike "out-of-phase" products, the frequency of occurrences of the different thicknesses also varies, that is to say, there is a variation in the percentages of occurrences of the different thicknesses. A cross-cut snack product has variations in texture and flavor characteristics and is relatively more durable than "out-of-phase" products since there are no continuous linear mating valleys which result in weak areas. A variation of the cross-cut snack product is the so-called "lattice" cut chip. In a "lattice" chip, the corrugations on one surface of the product intersect with the corrugations on the opposite surface of the product, resulting in a perforated chip. Cross-cut snack food products have also met with consumer approval.

Known devices to produce cross-cut corrugations generally require rotation of a vegetable between slicing steps, and thus have one or more disadvantages such as requiring excess maintenance, high capital costs, and the like. Examples of known cross-cut devices are shown in expired U.S. Pat. Nos. 1,965,500 and 1,965,501 to Knott.

There remains a need in the art for a relatively simple, low cost method and apparatus for producing a snack food product, particularly one made from farinaceous material, in which the food product has cross-cut corrugations.

SUMMARY OF THE INVENTION

The invention relates to a method and apparatus for producing an extruded, generally planar snack food product having a plurality of parallel ridges and valleys, or corrugations, on each surface, in which the ridges and valleys on one side of the food product are at an angle relative to the ridges and valleys on the other side. The invention also relates to an extruded snack food product having cross-cut corrugations. The food product is made by extruding a tubular member of edible material and forming ridges and valleys on the inside and outside surfaces of the tubular member during the extrusion and during movement of the extruded tubular member to thereby produce an extruded tubular member having parallel ridges and valleys extending in a generally helical pattern on at least one surface of the tubular member with the parallel ridges and valleys on the inside and outside surfaces of the tubular member extending at an angle relative to each other. The tubular member is thereafter further processed to form a snack product.

BRIEF DESCRIPTION OF THE DRAWINGS

FIG. 1 is a detailed edge view, partially schematic, of a portion of a cross-cut snack food produced according to the invention.

FIG. 2 is a front elevational view of a die apparatus according to the invention.

FIG. 3 is a perspective view of tubular material having a cross-cut pattern extruded through a die apparatus according to the invention.

FIG. 4 is an elevational view of the outer surface of a slit and flattened tube of material extruded through a die apparatus according to the invention.

FIG. 5 is an elevational view in partial cross-section of a die apparatus according to the invention mounted at an extruder outlet.

DESCRIPTION OF THE PREFERRED EMBODIMENTS

As illustrated in FIG. 1, an extruded, generally planar snack food product is indicated generally by the number 10, and has a series of ridges and valleys, or corrugations, 12 and 14 on both sides thereof. The corrugations on either side are parallel, but those on the opposite side are at an angle relative to the corrugations on the other side. Corrugations on opposite sides of the snack product may be non-intersecting as shown, or may intersect to form a "lattice" cut or perforated snack product.

A die apparatus 16 for producing cross-cut food products according to a preferred embodiment of the invention is shown in FIGS. 2 and 5, and comprises an outer die member 18 and inner die member 20. The inner and outer die members are mounted in spaced relationship at the outlet of an extrusion housing 31 to form an annulus 26. Die members 18 and 20 have a series of ridge and valley forming means 22 and 24 respectively on their surfaces defining annulus 26. For production of fried snack food products, the distance between the closest die surfaces of die members 18 and 20 (annular width) is about zero inch for "lattice" cut products and preferably from about 0.01 inch to about 0.05 inch for non-perforated snacks. The maximum die opening distance 21 is preferably from about 1/16 inch to about ⅜ inch.

Corrugations 12 and 14 are formed at a cross-cut angle by rotation of either of die members 18 or 20 in either direction, represented by arrows 28 and 30, by rotation of both die members 18 and 20 in opposite directions or in the same direction at different speeds.

Conventional means may be used for rotation of the die member or members, such as those employed in meat grinders and the like. According to the embodiment illustrated in FIG. 5, only inner die member 20 is rotated while outer die member 18 is fixed. As shown in FIG. 5, inner die member is rotated by shaft 33 and attached thereto by means of bolt 35. Shaft 33 is rotated by means of attached sprocket 37, which in turn is rotated by connection with chain drive and motor means (not shown). According to this embodiment, outer die member 18 is fixedly attached to housing 31 by means of bolts 39.

FIG. 3 illustrates a hollow tube 32 of edible material which has been extruded by an extrusion die apparatus shown in FIG. 5. As shown in FIG. 3, the ridge and valley formers 22 and 24 have formed mirror image impressions on the inner and outer surfaces of tube 32, although the impressions need not be mirror-image impressions. The cross-cut pattern of FIG. 3 is produced when only the inner die member 20 is rotated, resulting in helical corrugations 14 on the inner surface of tube 32, and corrugations 12 on the outer surface of tube 32 which are parallel to the direction of extrusion 34.

Alternatively, if only outer die member 18 is rotated, a helical pattern will be on the outer surface of the extruded tube. If both the outer and inner die members 18 and 20 are rotated, a helical pattern of parallel ridges and valley will be on both the inner and outer surfaces of the extruded tube.

The invention is not limited to any particular type of die configuration. Persons of ordinary skill in the art will readily recognize that a great variety of die configurations can be used to produce non-perforated food products having cross-cut configurations which fall within the scope of the invention. The amplitudes, wavelengths, and particular shape of corrugated ridge and valley-forming means 22 and 24 can be varied as desired to produce an assortment of products having different variations in texture and flavor characteristics.

The die dimensions used to define various die configurations which have been used to produce snack products are summarized in Table I, where arrows drawn from the center 46 of inner die member 20 represent, respectively, minimum distance 48 to surface of die 20, maximum distance 50 to surface of die 20, minimum distance 52 to surface fo die 18, and maximum distance 54 to surface of die 18. See FIG. 2. The ridge heights 40 and 42 are identical for both dies, but can be different if desired. Gear-like teeth on a rotating die member are preferably helical at an angle corresponding to the cross-cut angle of the snack product, to minimize distortion of the corrugations. Thus, for production of snack products having a 45° cross-cut angle, the gear-like teeth on a rotating die member are preferably 45° helical. Pitch values are given in corrugation wavelengths per inch.

TABLE I

| Die Configurations | |
| --- | --- |
| FIG. 4 Dimensions (in.) | FIG. 3 Dimensions (in.) |
| Die A | |
| 48 = 0.865 | Annular width 44 = 0.040 |
| 50 = 0.960 | Ridge height 40,42 = 0.095 |
| 52 = 1.000 | Peak-to-Peak 36 = 0.230 |
| 54 = 1.095 | |
| Outer die 18 = 24 pitch | |
| Inner die 20 = 16 pitch | |
| Die B | |
| 48 = 0.945 | Annular width 44 = 0.040 |
| 50 = 1.000 | Ridge height 40,42 = 0.055 |
| 52 = 1.040 | Peak-to-Peak 36 = 0.150 |
| 54 = 1.095 | |
| Outer die 18 = 24 pitch | |
| Inner die 20 = 16 pitch | |
| Die C | |
| 48 = 1.005 | Annular width 44 = 0.035 |
| 50 = 1.0325 | Ridge height 40,42 = 0.0275 |
| 52 = 1.0675 | Peak-to-Peak 36 = 0.090 |
| 54 = 1.095 | |
| Outer die 18 = 24 pitch | |
| Inner die 20 = 24 pitch | |
| Die D | |
| 48 = 1.005 | Annular width 44 = 0.020 |
| 50 = 1.040 | Ridge height 40,42 = 0.035 |
| 52 = 1.060 | Peak-to-Peak 36 = 0.090 |
| 54 = 1.095 | |
| Outer die 18 = 24 pitch | |
| Inner die 20 = 24 pitch | |

Conventional types of extruders may be used with the die of the invention, including, for example, extruders having piston or auger devices. Material for forming a product according to the invention may be extruded at any suitable velocity. The angle of cross-cut depends on the rotational speed of of the rotating die member or members relative to the speed at which tube 32 is extruded. Increasing the extrusion rate reduces the cross-cut angle for a given die rotational speed. Thus, as extrusion velocity increases, the rotational velocity of the die must correspondingly increase if the same cross-cut angle is desired, and vice-versa. The theoretical limit on cross-cut angle when only one die member rotates is 90°, that is, a right angle cross-cut. As a practical matter, a 90° cross-cut is never achieved with a single rotating die, as this would require an infinite rotational speed. A 90° angle can easily be realized, however, when both die members are rotated in opposite directions.

Virtually all cross-cut angles will result in a product having a variation in thicknesses as well as a variation in the frequency of occurrences of different thicknesses, i.e., a variation in the percentages of occurrences of the different thicknesses. However, these variations become more pronounced at cross-cut angles in excess of about 5°. Cross-cut angles of from about 30° to about 90° are preferred for fried snack food products, with cross-cut angles of from about 45° to about 90° being particularly preferred. With a single rotating die member, cross-cut angles of from about 30° to about 60° are easily achievable and are preferred, whereas with dual rotating die members, cross-cut angles of from about 45° to about 90° are preferred.

After extrusion through the die 16, the tube of edible material 32 is divided into snack size pieces. This can be accomplished by any suitable means, such as by splitting tube 32 with a knife edge to form a sheet 32a which can be flattened using any suitable means such as by action of gravity against a belt conveyor. FIG. 4 illustrates the outer surface of a flattened sheet 32a having longitudinal corrugations 12 formed by stationary die 18. Corrugations 14 on the inner surface of flattened sheet 32a are formed by inner rotating die 20. The sheet can be cut to any desired shape and fried or cooked by conventional means to form the end product.

Extruded snack food products according to the invention may be of any desired overall thickness. The cooking time of cross-cut snack food products is reduced over non-cross-cut products having a similar overall thickness. As illustrated in FIG. 1, the cross-cut food product of the invention can have a relatively large overall thickness 36 "peak-to-peak", that is, from the top of the ridges on one side to the top of the ridges on the opposite side. Points from within the food product, however, for the most part, have a relatively short "nearest distance to surface", represented by arrows 38. This reduces the cooking time accordingly.

Table II illustrates a typical volume distribution of distance-range-to-surface for a food product having a cross-cut angle of 90°, a peak-to-peak dimension 36 of 0.200 inch, ridge heights 40 and 42 of 0.090 inch, and a minimum thickness 44 of 0.020 inch.

TABLE II

| Inside to Surface Distances | |
|---|---|
| Distance Range to Surface (in.) | % Volume in This Range |
| .0111–.0163 | 9 |
| .0163–.0215 | 6 |
| .0215–.0267 | 12 |
| .0267–.0318 | 10 |
| .0318–.0370 | 16 |
| .0370–.0422 | 14 |
| .0422–.0474 | 13 |
| .0474–.0526 | 12 |
| .0526–.0578 | 6 |
| .0578–.0629 | 2 |
| | 100% |

As can be seen in Table II, even though there is a maximum thickness of 0.200 inches peak-to-peak, there is a maximum of 0.0629 inches to the surface from any given point within the food product. Most distances to the surface are much less.

Table III illustrates a typical variation in thickness in a cross-cut food product having a cross-cut angle of 90°, a peak-to-peak thickness 36 of 0.220 inches, ridge heights 40 and 42 of 0.100 inches, and minimum thickness 44 of 0.02 inches.

TABLE III

| Die Thickness Distribution | |
|---|---|
| Thickness Range (in.) | Percent of Sampled Points in Specified Range |
| .020–.042 | 9 |
| .042–.064 | 12 |
| .064–.087 | 4 |
| .087–.109 | 12 |
| .109–.130 | 26 |
| .130–.152 | 12 |
| .152–.174 | 4 |
| .174–.196 | 12 |
| .196–.220 | 9 |
| | 100% |

From Table III, it is apparent that the variation in thickness is substantial, giving the cross-cut food product, after frying, a variation in texture and flavor characteristics as noted above.

In general, as the range of thicknesses for a given product is increased, the variation in texture and flavor characteristics is also increased.

For fried snack food products, overall peak-to-peak thicknesses are preferably within the range of from about 1/16 inch to about ⅜ inch, and the pitch of the corrugations on the surfaces of the snacks is preferably within the range of from about 10 wavelengths per inch to about 30 wavelengths per inch. Ridge heights (from peak to valley on one side) on each surface of fried snack foods are preferably from about 0.02 inch to about 0.1 inch.

Examples of products that can be made using the method and apparatus of the invention include corn chips, formed potato chips, wheat chips, multi-grain chips, crackers, pretzel chips, dried meat chips (e.g., jerky), fruit-containing matrices (e.g., fruit leather), and the like.

The invention is particularly suitable for extrusion of non-aerated (non-puffed) farinaceous doughs which do not undergo a great deal of expansion and distortion on extrusion. Because of the substantial expansion and distortion of puff-extruded or aerated doughs on extrusion, the desired results of the invention are reduced when using such doughs.

Conventional cooking means, such as baking or frying, may be employed to produce a snack according to the invention. Baking is a suitable cooking means for producing crackers or pretzel chips using the invention. It is preferable to use the method and apparatus of the invention to produce fried snack food products such as corn chips, formed potato chips, wheat chips and multi-grain chips. Fried snack food products produced according to the invention can be fried at any suitable temperature, e.g., 300° F.–450° F., as is well known in the art. In order to produce a commercially acceptable fried snack food product, the moisture content of the product is reduced to about 2% by weight or less by frying.

The following examples further illustrate the invention, and are not intended to be limiting.

EXAMPLE I

Cross-Cut Corn Chips (From Fresh Corn Masa)

Corn was cooked and soaked overnight in lime water. The corn was rinsed and milled into a dough (moisture content about 55%). The dough was extruded with a piston driven extruder through a cross-cut extrusion die "D" of Table I as a thin hollow tube with a cross-cut angle of about 45°, cut into a sheet and then into square pieces about 1½"×1½". The pieces were fried in vegetable oil at 410° F. for 75 seconds and yielded a chip product with a rich, hearty, pleasant corn flavor, nice crunchy texture, but not overly hard. Internal die member 20 was rotated at typical speeds of rotation of 5–20 rpm.

EXAMPLE II

Cross-Cut Dehydrated Corn Masa Chips

A corn dough was prepared from commercial dehydrated corn masa (Maseca) mixed with warm water to yield a dough with a temperature of about 120° F. and a moisture content of about 57%. This was done by mixing the dry corn masa and warm water in a large Hobart mixer with a dough hook for 5 minutes. The resulting dough was extruded with a piston-driven extruder through a cross-cut die "D" of Table I, to form a thin dough tube with a cross-cut angle of about 45° which was split into a dough sheet, and the sheet cut into square pieces about 1½"×1½". The dough pieces were fried in vegetable oil at 390° F. for 1 minute 45 seconds. The product had very nicely formed ridges, a nice browned corn chip flavor, and good crunchy texture. Internal die member 20 was rotated at typical speeds of rotation of 5–20 rpm.

EXAMPLE III

Cross-Cut Multigrain Chips

Equal weights of triticale (boiled 10 minutes, cooled, and drained) and corn (cooked and soaked overnight in lime water and rinsed) were mixed and milled into a dough of about 55% moisture content. The dough was extruded through a cross-cut die "A" of Table I with a piston-driven extruder. The dough tube had a cross-cut angle of about 45°, was split into a sheet, and cut into square pieces about 1½"×1½". The product had a nice cross-cut ridge pattern, had a good, rich, grainy corn flavor, and a good crunchy texture. Internal die member 20 was rotated at typical speeds of rotation of 5-20 rpm.

Since many modifications, variations and changes in detail may be made to the described embodiments, it is intended that all matter in the foregoing description and shown in the accompanying drawings be interpreted as illustrative and not in a limiting sense.

What is claimed is:

1. A method of making an extruded substantially planar snack food product having a variety of texture characteristics, the product having a plurality of parallel ridges and valleys on one face and a plurality of parallel ridges and valleys on an opposite face, the parallel ridges and valleys on the two faces extending at an angle relative to each other, the method comprising:
    (a) extruding edible material to form a moving imperforate tubular member of said edible material, the tubular member having non-intersecting parallel ridges and valleys on the inside and outside surfaces of the tubular member formed during extrusion and during movement of the extruded tubular member to thereby produce an extruded tubular member having parallel ridges and valleys extending in a substantially helical pattern on at least one surface of the tubular member with the parallel ridges and valleys on the inside and outside surfaces extending at an angle relative to each other; and
    (b) forming the extruded member into a substantially planar snack food product having a variety of texture characteristics.

2. The method of claim 1, wherein said extruded tubular member is divided into snack size pieces after forming said parallel ridges and valleys.

3. The method of claim 2, wherein said extruded tubular member is divided into snack size pieces in steps which include first slitting the tubular member and thereafter flattening the slit, extruded member to a substantially planar form with the ridges and valleys on opposite faces extending at an angle relative to each other.

4. The method of claim 1, wherein said food product contains farinaceous material.

5. The method of claim 4, wherein the snack food product is a fried snack food product.

6. The method of claim 4, wherein the snack food product is a baked snack food product.

7. The method of claim 1, wherein the parallel ridges and valleys on one face of the extruded member are at an angle of from about 5° to about 90° relative to the parallel ridges and valleys on the opposite face.

8. The method of claim 1, wherein the parallel ridges and valleys on one face of the extruded member are at an angle of from about 30° to about 90° relative to the parallel ridges and valleys on the opposite face.

9. The method of claim 1, wherein the parallel ridges and valleys on one face of the extruded member are at an angle of from about 45° to about 90° relative to the parallel ridges and valleys on the opposite face.

10. The method of claim 1, wherein the food product produced has a thickness of from about 1/16 inch to about ⅜ inch, measured from the peak of the ridges on one face to the peak of the ridges on the opposite face.

11. The method of claim 1, wherein the food product is corn chips, formed potato chips, wheat chips, multigrain chips, crackers, pretzel chips, dried meat chips or fruit-containing matrices.

12. The method of claim 7, wherein one ridge and valley former is rotated to produce a cross-cut angle of from about 30° to about 60°.

13. The method of claim 12, wherein the rotating ridge and valley former forms parallel ridges and valleys in a substantially helical pattern on the inside surface of said tubular member.

14. The method of claim 12, wherein the rotating ridge and valley former forms parallel ridges and valleys in a substantially helical pattern on the outside surface of said tubular member.

15. The method of claim 7, wherein two ridge and valley formers are rotated in opposite directions to produce parallel ridges and valleys in substantially helical patterns on both the inside and outside surfaces of said tubular member.

16. The method of claim 15, wherein said ridge and valley formers are rotated to produce a cross-cut angle of from about 45° to about 90°.

17. The method of claim 5, wherein the food product is non-puffed.

18. The method of claim 17, wherein the food product is corn chips, formed potato chips, wheat chips or multi-grain chips.

19. A method of making an extruded substantially planar snack food product having a variety of texture characteristics, the product having a plurality of parallel ridges and valleys on one face and a plurality of parallel ridges and valleys on an opposite face, the parallel ridges and valleys on the two faces extending at an angle relative to each other, the method comprising:
    (a) extruding edible material through a die to form a continuous imperforate moving extruded member of said edible material, the die forming parallel ridges and valleys on opposite surfaces of the extruded member during extrusion and during movement of the extruded member, the parallel ridges and valleys on opposite surfaces of the extruded member being non-intersecting and extending at an angle relative to each other;
    (b) forming the extruded member into a substantially planar snack food product having a variety of texture characteristics.

20. A method of making an extruded substantially planar snack food product having a variety of texture characteristics, the product having a plurality of parallel ridges and valleys on one face and a plurality of parallel ridges and valleys on an opposite face, the parallel ridges and valleys on the two faces extending at an angle relative to each other, the method comprising:
    (a) extruding edible material through a die to form a continuous imperforate moving extruded member of said edible material, the die forming parallel ridges and valleys on opposite surfaces of the extruded member during extrusion and during movement of the extruded member, the parallel ridges and valleys on opposite surfaces of the extruded member being non-intersecting and extending at an angle relative to each other;

(b) dividing the member into substantially planar snack-sized pieces; and
(c) frying the snack-sized pieces to produce a substantially planar snack product having a variety of texture characteristics.

* * * * *